Figure 1:
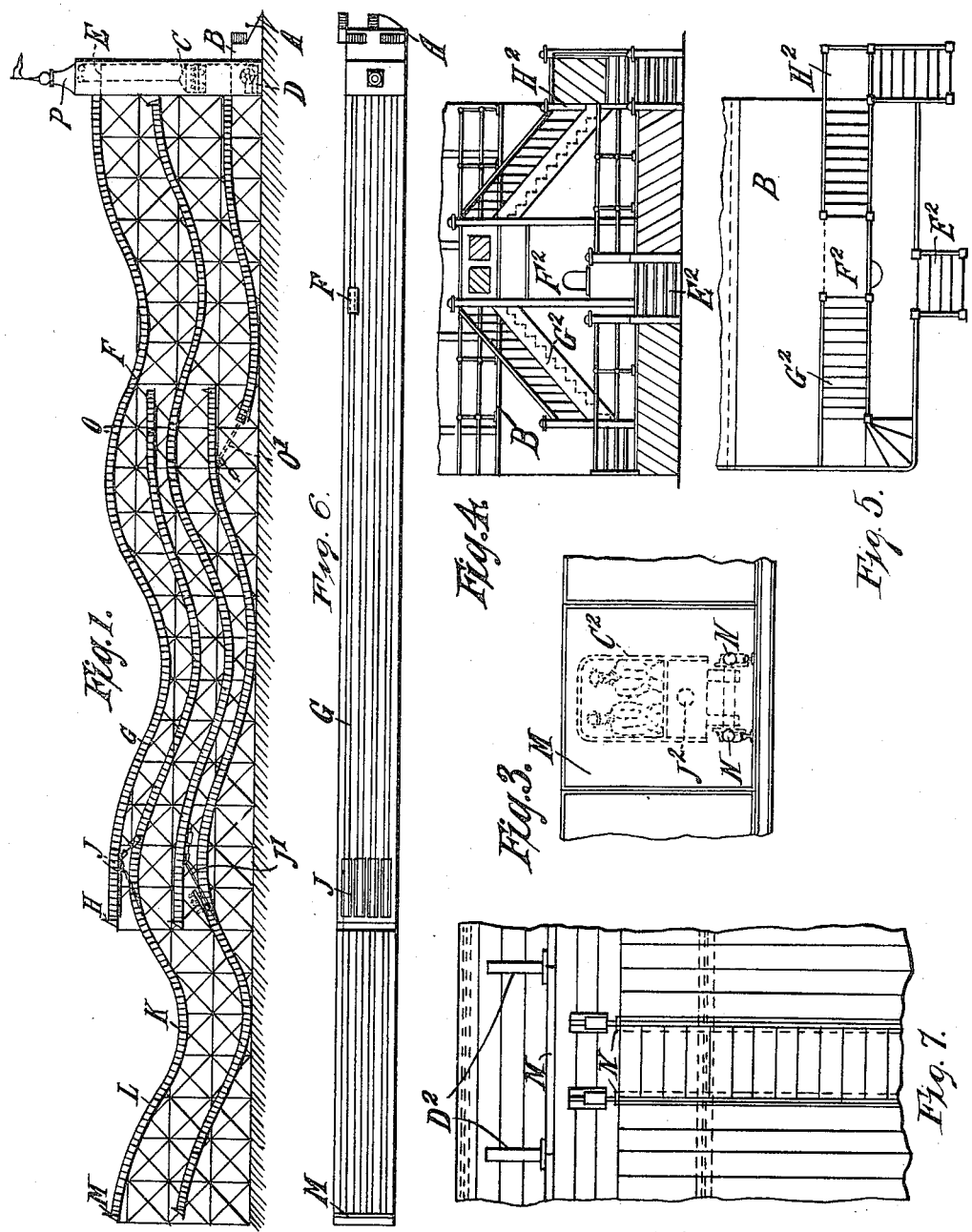

L. C. J. BOURACIER.
AMUSEMENT APPARATUS.
APPLICATION FILED DEC. 3, 1912.
1,075,397.
Patented Oct. 14, 1913.
2 SHEETS—SHEET 2.
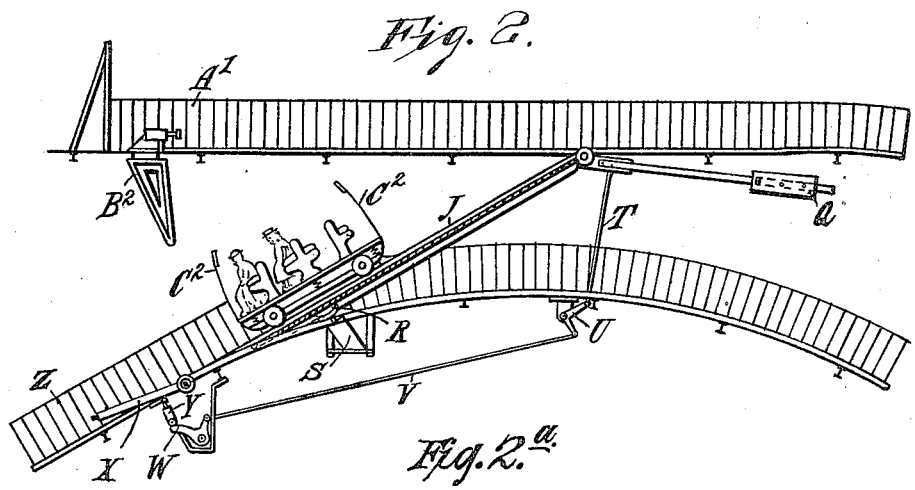
Fig. 2.
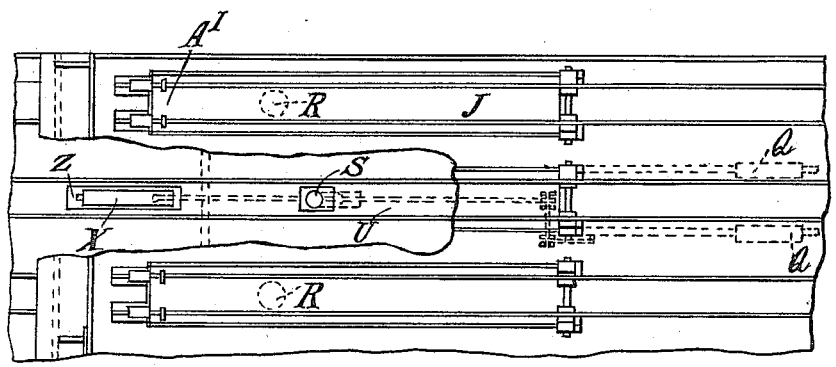
Fig. 2ª.
WITNESSES
INVENTOR
L. C. J. Bouracier
HIS ATTY.

UNITED STATES PATENT OFFICE.

LOUIS CLAUDE JOSEPH BOURACIER, OF BALHAM, LONDON, ENGLAND.

AMUSEMENT APPARATUS.

1,075,397.   Specification of Letters Patent.   Patented Oct. 14, 1913.

Application filed December 3, 1912.   Serial No. 734,761.

*To all whom it may concern:*

Be it known that I, LOUIS CLAUDE JOSEPH BOURACIER, professor of languages, subject of the King of Great Britain, residing at 113 Cathles road, Balham, London, S. W., England, have invented certain new and useful Improvements Relating to Amusement Apparatus, of which the following is a specification.

The invention has reference to certain improvements in or relating to amusement apparatus of that type in which the tracks are arranged in several tiers in elevation and the provision of a swinging or dipping plane at the rear end of the respective tracks for effecting sudden transit or descent of a car from one track to another in a forward direction then backward along such track with a further sudden transit or descend on to a third track with a forward and backward movement and so on until the car finally slows up at the platform where the passengers leave the car. The tracks in apparatus of this type as hitherto constructed or proposed have been inclined or curved toward each other in opposite directions the swing-plane of one track over-lying the inclined or curved track below and the swinging planes effecting the change have been placed at or about the bottom of the track on which the car was traveling so that the change of track took place when the car was traveling with a high velocity.

The present invention is designed to introduce certain improvements in this type of amusement apparatus whereby the tracks are arranged in a series of switchback undulations one overlying the other and swing planes are arranged at or near the highest point of the track on which the car is traveling to transfer it to the next track. The change is thus effected when the speed of the car is comparatively small and greater safety is thereby insured while at the same time I am enabled to employ devices for preventing accident in case one of such swinging planes fails to act and am also enabled by the use of mirrors to produce the effect of impending collision. The car also as in the case of ordinary switchbacks can run the full length of the track and the position at final rest is arranged at the end so as to facilitate the hoisting of the cars for the next journey.

The invention also provides means for arresting the motion of a car in case any one of the said swinging or dipping planes fails to return to the normal position after the passage over it of the car and the employment of mirrors located in front of the said swinging or dipping planes, to produce the sensation of impending collision, although I admit the previous use with gravity railways of mirrors arranged alongside the track for the purpose specified.

My invention also comprises the general arrangement and combination of parts of amusement apparatus as described and shown in the accompanying drawings wherein—

Figure 1 represents in plan and elevation a switch-back railway constructed in accordance with this invention. Fig. 2 is an enlarged side elevation of a portion of the amusement apparatus showing the drop track arrangement. Fig. 2$^a$ is a top plan view of the structure illustrated in Fig. 2. Fig. 3 is a front view of a portion of the trackway. Fig. 4 is an elevation of the entrance to the trainway or amusement device. Fig. 5 is a top view of the structure illustrated in Fig. 4. Fig. 6 is a top plan view of the structure illustrated in Fig. 1. Fig. 7 is a top plan view of the drop track.

As seen in elevation the undulating or switchback tracks are arranged in tiers one above another in the manner shown. The cars traversing the respective tracks are caused to descend from one track to another by swinging or dipping planes J O J' and O' located at the rear end of the tracks as will be shortly described.

A indicates entrance to and exit from railway shown in a larger scale on Fig. 4.

B denotes platform from which passengers start. Empty cars are run straight into lifts C on platform B and passengers enter the cars while in the lifts. The lifts laden with cars and passengers are then raised by means of haulage D to starting platform E.

There being four distinct sets of lines shown in plan view Fig. 1 four separate lifts would be employed for raising cars and passengers to the starting platform in order that four cars may be set running at once on the respective tracks. Of course any number of tracks may be constructed and one or more cars are run on the same track. By means of a hand lever (not shown) the operator tilts the lift floor slightly upward at back end thus causing car to start on its journey.

F indicates the car on the top track. Starting from platform E a car traverses two ordinary switch-back undulations along the uppermost track; and as it ascends slope G the passengers see the reflection of their car in mirror H which gives the passengers a sensation of impending collision. This collision does not occur since when the car arrives on swing plane J which is hinged or jointed to the rear end of the track the weight of the car will cause the platform to dip down and send the car on to the lower track K.

As seen in Fig. 2ª swing plane J is counterbalanced by weighted levers Q which of course restore J to its original position when car leaves it. To absorb the shock of the swing plane J as it falls on the lower track a suitably designed elastic cushion R and spring buffer S are fitted. The car now traversing the lower track K ascends the slope L which almost stops impetus of car but as the car approaches mirror M the passengers receive the sensation of another impending collision which actually takes place in this case the car striking a pair of spring buffers N (see Fig. 3) located in front of the mirror. The impact however though not very great will give the passengers a slight shock in their seats. The car now rolls backward down the slope L and traverses to the rear or inner end of the second track until it reaches the swing plane O which operates in the same way as plane J. The rest of the journey is exactly as already described the planes J' and O' being respectively operated in turn the car finally slowing up and finishing its journey into the lift on platform "B." Two safety devices are shown in Fig. 2ª for automatically preventing accidents in the event of swing planes not working properly. As the operation of these is preferably similar I will describe the same with reference to Fig. 2ª. As swing plane J falls the pivoted flap X rises by the movement of the system of connecting rods and levers T U V and W. The rod T pivotally connected to the weighted arm O raises the bell crank lever U giving a backward movement to the rod V and thereby raising the pivoted flap X by bringing the curved arm W under spring plunger Y. The function of the spring plunger Y is to allow the pivoted flap X to be depressed by the weight of the car as same passes down the incline when leaving the swing plane. In the event of the swing plane not being returned to the normal position after the car has left it, the system of levers, T U V and W will continue to hold pivoted flap a little above level of track as shown. The car is stopped on its return journey by colliding with the spring buffers Z fixed at the fore end of the flap X and will eventually come to a state of rest at the bottom of the dip K. Should the swing plane J not fall when car runs on to same, spring buffers A' shown in Figs. 2 and 2ª prevent car actually running off swing plane J. Should J now fall when car is nearly or actually in contact with the buffers A' the guides B² acting in conjunction with the stout iron guides C² on the car will cause same to reach the lower track safely.

Fig. 3 shows a portion of track adjoining mirror "M" in Fig. 1. The mirrors can be mounted in an iron frame and held by stout props D². The dotted outline of car shown in this figure is intended to convey the idea of the reflection of a car as seen by passengers approaching the mirror. J² shows where a red light may be fitted to add to the sensation at night.

What I do claim as my invention and desire to secure by Letters Patent is:—

1. In an amusement device of the class described the combination with a plurality of track sections, one section being arranged above the other, a hinged section secured to one of said tracks and adapted to swing down in engagement with the other track, a counterbalancing weight coöperating with said hinged section of said track for normally holding the same in a horizontal position, a lever secured to an adjacent track, a car adapted to travel upon said tracks and engage said lever for automatically swinging said hinged section of said track to its normal position after a car has been removed therefrom.

2. In a device of the class described the combination with a plurality of track sections, one of said sections provided with a hinged section, an operating lever carried by the other track, link members connected to said operating lever and said hinged section for automatically returning the same to its normal position after a weight has been removed therefrom.

3. In an amusement device of the class described the combination with a plurality of tracks, one track being arranged above the other, the upper track being provided with a hinged door, a car adapted to travel upon said upper track and move upon said door whereby said car may be discharged from said upper to said lower track, a returning lever pivotally secured to said lower track, a trigger suspended below said lower track, and lever means connected to said trigger and door for returning said door to its normal position after a weight has been removed therefrom.

In witness whereof I have signed this specification in presence of two witnesses.

LOUIS CLAUDE JOSEPH BOURACIER.

Witnesses:
GEORGE PRINGLE,
ERNEST MORRIS.

Copies of this patent may be obtained for five cents each, by addressing the "Commissioner of Patents. Washington, D. C."